(12) United States Patent
Ward et al.

(10) Patent No.: US 9,477,637 B1
(45) Date of Patent: Oct. 25, 2016

(54) INTEGRATING CONTENT-ITEM CORRECTIONS

(75) Inventors: Charles L. Ward, Sammamish, WA (US); Donald Ryan Willhoit, Bainbridge Island, WA (US); Lars C. Ulness, Seattle, WA (US); Gerald Ken Sun, Palo Alto, CA (US); Sherif M. Yacoub, Seattle, WA (US); Colin Bodell, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/047,070

(22) Filed: Mar. 14, 2011

(51) Int. Cl.
| | |
|---|---|
| *G06F 17/21* | (2006.01) |
| *G06F 17/00* | (2006.01) |
| *G06F 17/24* | (2006.01) |
| *G09G 5/00* | (2006.01) |

(52) U.S. Cl.
CPC ............... *G06F 17/00* (2013.01); *G09G 5/00* (2013.01)

(58) Field of Classification Search
CPC ...................................................... G06F 17/00
USPC ................................................................ 715/256
See application file for complete search history.

(56) References Cited

U.S. PATENT DOCUMENTS

| | | | | |
|---|---|---|---|---|
| 5,761,681 | A * | 6/1998 | Huffman et al. | 715/210 |
| 5,828,882 | A | 10/1998 | Hinckley | |
| 6,551,357 | B1 * | 4/2003 | Madduri | 715/235 |
| 6,567,830 | B1 * | 5/2003 | Madduri | 715/235 |
| 6,711,620 | B1 | 3/2004 | Yoshii et al. | |
| 8,207,846 | B2 * | 6/2012 | Van Hoff et al. | 340/539.28 |
| 8,239,759 | B1 * | 8/2012 | Sundermeyer | G06F 17/24 715/255 |
| 8,244,277 | B1 | 8/2012 | Cha et al. | |
| 2002/0106188 | A1 * | 8/2002 | Crop et al. | 386/52 |
| 2003/0018582 | A1 | 1/2003 | Yaacovi | |
| 2003/0212559 | A1 | 11/2003 | Xie | |
| 2004/0090390 | A1 | 5/2004 | Mason et al. | |
| 2004/0216135 | A1 | 10/2004 | Heimbeck | |
| 2004/0268253 | A1 * | 12/2004 | DeMello | G06F 17/241 715/230 |
| 2005/0033747 | A1 * | 2/2005 | Wittkotter | 707/10 |
| 2005/0229183 | A1 | 10/2005 | Araujo et al. | |
| 2007/0198314 | A1 | 8/2007 | Andrew et al. | |
| 2008/0134025 | A1 * | 6/2008 | Harada | 715/255 |
| 2008/0168073 | A1 * | 7/2008 | Siegel et al. | 707/100 |
| 2008/0229190 | A1 | 9/2008 | Johnson | |
| 2010/0235741 | A1 | 9/2010 | Newman et al. | |
| 2011/0087603 | A1 | 4/2011 | Garcia et al. | |
| 2011/0087955 | A1 * | 4/2011 | Ho et al. | 715/230 |

(Continued)

OTHER PUBLICATIONS

Mobipocket, "What is the Mobipocket File Format?", 5 pages (Apr. 2008), available at http://www.mobipocket.com/dev/article.asp?BaseFolder=prcgen&File=mobiformat.htm.*

(Continued)

*Primary Examiner* — James J Debrow
(74) *Attorney, Agent, or Firm* — Lee & Hayes, PLLC

(57) ABSTRACT

Techniques for enhancing content being rendered on an electronic device are described herein. In some instances, the techniques include monitoring interactions between a user and a content item that the user consumes on an electronic device. The content items may include electronic books, songs, videos, documents, or the like. In response to detecting an interaction between the user and the content item, the techniques may publish an event indicative of the interaction to an application platform that hosts one or more applications. The applications may be designed to enhance the content that the user consumes in one or more specified ways.

34 Claims, 11 Drawing Sheets

(56) References Cited

U.S. PATENT DOCUMENTS

| | | |
|---|---|---|
| 2011/0153728 A1 | 6/2011 | Einarsson et al. |
| 2011/0167350 A1 | 7/2011 | Hoellwarth |
| 2011/0195695 A1 | 8/2011 | Gupta et al. |
| 2011/0219384 A1 | 9/2011 | Clark et al. |
| 2011/0261030 A1 | 10/2011 | Bullock |
| 2011/0306304 A1 | 12/2011 | Forutanpour et al. |
| 2012/0036429 A1 | 2/2012 | Ajima |
| 2012/0066581 A1 | 3/2012 | Spalink |
| 2012/0150655 A1 | 6/2012 | Seth et al. |
| 2012/0151351 A1 | 6/2012 | Kilroy et al. |
| 2012/0206472 A1 | 8/2012 | Kandekar et al. |
| 2013/0232409 A1* | 9/2013 | Cranfill et al. .......... 715/256 |

OTHER PUBLICATIONS

Office action for U.S. Appl. No. 13/047,043, mailed on Aug. 21, 2013, Ward et al., "Selecting Content-Enhancement Applications," 24 pages.

Office Action for U.S. Appl. No. 13/047,043, mailed on Dec. 19, 2013, Charles L. Ward, "Selecting Content-Enhancement Applications," 26 pages.

Non-Final Office Action for U.S. Appl. No. 13/047,070, mailed on Dec. 6, 2012, Charles L. Ward et al., "Integrating Content-Item Corrections," 28 pages.

Office action for U.S. Appl. No. 13/047,043, mailed on Mar. 25, 2013, Ward et al, "Selecting Content-Enhancement Applications," 22 pages.

Office action for U.S. Appl. No. 13/047,017, mailed on Apr. 25, 2013, Ward et al., "Content Enhancement Techniques," 33 pages.

Office action for U.S. Appl. No. 13/047,043, mailed on Jul. 24, 2014, Ward et al., "Selecting Content-Enhancement Applications", 37 pages.

Office Action for U.S. Appl. No. 13/047,017, mailed on Aug. 21, 2014, Charles L. Ward, "Content Enhancement Techniques", 29 pages.

Office Action for U.S. Appl. No. 13/047,043, mailed on Dec. 5, 2014, Charles L. Ward, "Selecting Content Enhancement Applications:", 34 pages.

Final Office Action for U.S. Appl. No. 13/047,017, mailed on Feb. 27, 2015, Charles L. Ward, "Content Enhancement Techniques", 33 pages.

Office action for U.S. Appl. No. 13/047,043, mailed on Jul. 20, 2015, Ward et al., "Selecting Content-Enhancement Applications", 20 pages.

Office action for U.S. Appl. No. 13/047,017 mailed on Oct. 2, 2015, Ward et al., "Content Enhancement Techniques", 32 pages.

Notice of Allowance mailed Oct. 29, 2015 for U.S. Appl. No. 13/047,043.

* cited by examiner

INTEGRATING CONTENT-ITEM CORRECTIONS

BACKGROUND

The continued proliferation of digital content items has led to an increase in the availability of such items, as well as an increase in the availability of electronic devices used for consuming these items. For instance, users now consume electronic books, videos, songs, and the like on an assortment of stationary and/or portable electronic devices. As the number of items and devices continues to increase, users become increasingly interested in enhancing their experiences while consuming these items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
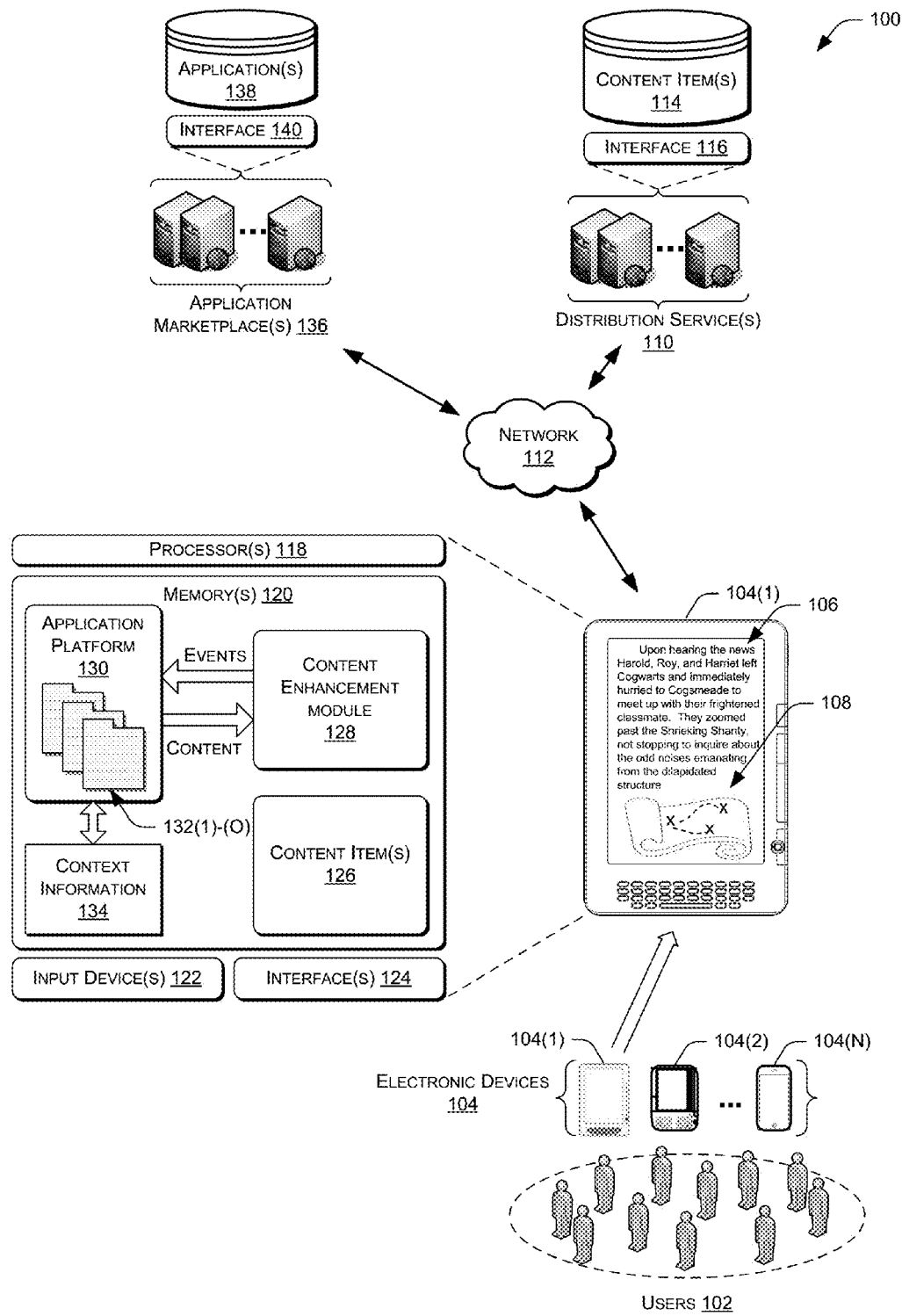
FIG. 1 illustrates an example architecture in which an electronic device renders content that supplements a content item that the user consumes on the device. As illustrated, the device stores a content enhancement module that publishes events indicative of the user's interactions with the content item. In response, the content enhancement module receives and renders additional content from one or more applications of an application platform.

This disclosure describes systems, devices, and processes (collectively "techniques") for enhancing content being rendered on an electronic device. In some instances, the techniques include monitoring events experienced by an electronic device and/or by a content item that the electronic device outputs. In some instances, these events are indicative of interactions between a user of the electronic device and a content item that the user consumes on the electronic device. In other instances, the events are indicative of events experienced by the device itself. For instance, these monitored events may comprise scheduled events, events indicating a current time, events indicating a current geographical location of the electronic device, events indicating current ambient light experienced by the electronic device, events indicating a current ambient temperature experienced by the electronic device, and/or the like.

In some of the examples described below, the events are indicative of interactions between a user and a content item that the user consumes on an electronic device. The content items may include electronic books, songs, videos, documents, or the like. In response to detecting an interaction between the user and the content item, the techniques may publish an event indicative of the interaction to an application platform that hosts one or more applications. The applications may be designed to enhance the content that the user consumes in one or more specified ways.

These applications may receive the published events to identify a current interaction between the user and the content item. For instance, the event may indicate that the user has turned a particular page, has highlighted certain text, has selected a particular icon, has adjusted a setting on the electronic device (e.g., volume, brightness, etc.), has provided an input to the electronic device, or that the user has interacted with the content item in any other way. In response to receiving the event and identifying the interaction, each of the applications may compare the event to a respective set of predefined events to which the application is configured to respond to. For instance, if the application is configured to render a particular piece of content in response to a user reaching a certain page of a certain electronic book, then the application may compare a published event to the set of predefined events to identify when this particular interaction occurs. In response to identifying such an interaction, the application may request to render (or otherwise output) the particular piece of predefined content.

In some instances, the applications may also reference additional context information associated with the events or with the content item being rendered to determine whether or not to respond to the event. For instance, the applications may determine an identity of the user consuming the content item to determine the user's preferences or past interactions. Additionally or alternatively, the applications may determine a current location of the electronic device, a current date or time of day, capabilities of the electronic device, whether the electronic device currently has network connectivity, or any other context associated with the published event.

After identifying the event and potentially additional context information associated with the event, one or more applications may request to provide additional content for output on the electronic device. The techniques may receive theses requests and may cause output of one or more pieces of the additional content provided by the application(s) of the application platform.

For instance, envision that a user is currently reading a particular electronic book that comprises text, but that does not ordinarily include illustrations of any sort. Envision also that another user has created an application that illustrates maps of locations that characters of the electronic book travel to within the book. In this example, envision that the user reading the book in the architecture 100 has downloaded this application for the purpose of enhancing her experience of reading the book. Therefore, as the user interacts with the book (e.g., by turning pages, etc.), the techniques may publish events indicating these interactions to the application platform that hosts this application.

In response to identifying an event indicating that the user has turned to a page that references the characters moving a new physical location within the story, the application may request to render a map along with the electronic book. As such, when the user reaches this location, she is shown a map that illustrates the different physical locations that are pertinent to the particular part of the story that she is currently reading. This illustration may enhance this user's consumption or enjoyment of the rendered electronic book.

In some instances, an electronic device may store or otherwise have access to many applications. As such, the techniques may limit which applications receive particular events and/or may limit which applications are able to output additional content. In the first instance, when the techniques detect an event, the techniques may determine which of multiple applications to which to publish the event. In the second additional or alternative instance, the techniques may receive additional content from multiple applications in response to a particular event, and may determine a subset of the additional content to output.

In each of these instances, the techniques may make the determination with reference to the context information discussed above. For instance, certain applications may have an affinity for certain content items and/or certain types of interactions. Therefore, the techniques may publish the events to these applications and/or may favor the outputting of content from these applications. Furthermore, the techniques may utilize any type of context information, such as time, location, user preferences, past user interactions, and the like. Furthermore, it is noted that some applications stored on the application platform may only be associated with a particular set of one or more content items, while other applications may provide content for output to a wide variety of content items.

While the discussion above provided the example of rendering a map while a user reads a particular electronic book, the applications may provide any sort of visual, audible, and/or tactile content for output, as discussed in detail below. In one particular example, an application may alter the primary content (e.g., the electronic book) on the display in response to identifying a particular event. For instance, when the user turns to a page of the electronic book that mentions one of the geographical locations described above, an application may make the font associated with the textual reference of the geographical location bold and oversized. Of course, while one example is given, the application(s) may alter the display or output of the content item in any other way.

In another particular example, an application may substitute a particular piece of content in a content item for another piece of content. For instance, one application may makes corrections to a content item. In this example, a user may download a corrections file that includes corrections (e.g., spelling errors, grammatical errors, etc.) made to a particular content item. Therefore, as the user reads the book, these interactions (e.g., page turns) are published to this and other applications on the applications platform.

At the appropriate pages, the corrections application sends a request to substitute a particular piece of text (e.g., word, sentence, paragraph, etc.) for a corresponding piece of text. For instance, the substituted text may correct a misspelled word. In response, the techniques may render the corrected text in lieu of the original text of the book. In some instances, the corrections file is separate from a file storing the contents of the electronic book and, as such, the provisioning of the correction(s) does not modify the file storing the contents of the book. Furthermore, while corrections files may function in the manner described immediately above, the techniques may render these corrections in other ways and in other architectures, as discussed below with reference to FIGS. 6-8.

The claimed techniques are described below with reference to several example architectures. However, it is to be appreciated that a number of other architectures may also employ these techniques.

Example Content

Enhancement Architecture

FIG. 1 illustrates an example architecture 100 in which a group of example users 102 employ respective electronic devices 104(1), 104(2), . . . , 104(N) (collectively "104") to consume varying types of content items. The electronic devices 104 may include electronic book readers, mobile phones, multifunctional devices, desktop computers, laptop computers, game consoles, personal media players, and the like. The content items, meanwhile, may include electronic books, audio files, video files, or the like. The terms content, content item, and electronic book include essentially any form of electronic data that may be consumed on a device, including textual and verbal works comprising sequences of words such as digital books, audio books, electronic magazines, papers, journals, periodicals, documents, instructional materials, course content, music, movies, and so on. In some examples, the users may employ electronic devices that include a display, while in other examples the electronic devices do not include a display, but rather include one or more other types of output components, such as speakers for outputting audio or the like.

FIG. 1 illustrates an example electronic device 104(1) that renders an electronic book 106 on a display of the device, as well as content 108 that supplements the electronic book 106 that is currently being rendered. In this example, the "additional" or "supplemental" content 108 comprises a map showing locations that are discussed within the electronic book. In other instances, meanwhile, the content 108 may comprise any content that supplements or enhances the illustrated electronic book, visually, audibly, tactilely, or otherwise.

In some instances, the example electronic device 104(1) may comprise a dedicated-purpose eBook reader device, having a flat-panel display and other characteristics that mimic the look, feel, and experience offered by paper-based books. For example, such eBook reader devices may have high-contrast flat-panel displays that appear similar to a printed page and that persist without frequent refreshing. Such displays may consume very negligible amounts of power, so that the eBook reader devices may be used for long periods without recharging or replacing batteries. In some instances, these readers may employ electrophoretic displays.

In the example of FIG. 1, a user employing the electronic device 104(1) may download or otherwise access the electronic book 106 from a distribution service 110 that is accessible over a network 112. The network 112 may be any type of communication network, including a local-area network, a wide-area network, the Internet, a wireless network, a wide-area network (WWAN), a cable television network, a telephone network, a cellular communications network, combinations of the foregoing, and/or the like.

In FIG. 1, the distribution service 110 is illustrated as a network-based or cloud-based service, available over a public network such as the Internet. The electronic devices 104 may be configured to allow the users 102 to conveniently browse for content and content items 114 from the service 110, and to obtain (e.g., purchase) and download selected content items from the service 110.

Various applications and user interfaces may be used in conjunction with the electronic devices 104 to interact with the service 110, such as Internet browser programs that allow a user to interactively engage different online services. In addition, the service 110 may expose lower-level interfaces or APIs (application programming interfaces) through the network 112, through which devices and programs can access the underlying functionality of the service 110 without direct user interaction. For example a user may interactively purchase an eBook or other content item using a personal computer or some device other than the example electronic device 104(1).

The service 110 might be implemented in some embodiments by an online merchant or vendor. Electronic books and other electronic content might be offered for sale by such an online merchant, or might be available to members or subscribers for some type of periodic or one-time fee. In some circumstances, electronic books or other content might be made available without charge. In either instance, the service 110 may include a client interface 116 through which electronic devices 104 interact with the service 110. The client interface may include a virtual storefront or other type of online interface for interaction with consumers and/or devices. The client interface may expose a graphical, web-based user interface that can be accessed by human users to browse and obtain (e.g., purchase, rent, lease, etc.) content items such as eBooks. The client interface may also expose programmatic interfaces or APIs that entities and devices can use to obtain digital content items and related services.

In the described embodiment, the electronic devices 104 include non-volatile storage capabilities so that electronic content items can be downloaded and stored in their entirety on the electronic devices. For instance, the example electronic device 104(1) may store the illustrated electronic book 106. In some instances, once an electronic book has been stored by an electronic device, it can be displayed and read at any time, whether or not the electronic device is connected to a network. In other embodiments, meanwhile, the electronic device may stream or otherwise receive content items on-demand.

As illustrated, the electronic device 104(1) includes one or more processors 118, memory 120, one or more input devices 122, and one or more interfaces 124. The input devices 122 allow a user to operate the electronic device 104(1), and may include a keyboard, a touch screen, or any other type of input device. The interfaces 124, meanwhile, may comprise wired or wireless interfaces that allow the electronic device 104(1) to communicate with the distribution service 110 and other entities.

In this example, the memory 120 stores or otherwise has access to one or more content items (e.g., the rendered electronic book 106), a content enhancement module 128, an application platform 130 that hosts one or more applications 132(1), . . . , 132(O), and context information 134. The device 104(1) may also include an array of other devices and modules found in traditional electronic devices, such as an operating system, various sensors (e.g., location sensors, altitude sensors, etc.), and the like.

At a high level, the content enhancement module 128 functions to monitor for events experienced by the device and/or by content items being output the device. For instance, the module 128 may monitor for interactions between a user of the device 104(1) and the electronic book 106 that the device 104(1) renders. These interactions may include the user turning a page in the book, reaching a page in the book that includes a hidden tag or other marker, highlighting or otherwise selecting text in the book, changing a font size of the book, annotating or otherwise commenting on the book, adjusting a setting (e.g., contrast, volume, etc.) of the device itself, or any other interaction. In response to detecting an interaction, the content enhancement module 128 publishes a corresponding event indicative of the interaction to one or more applications on the application platform 130. Additionally or alternatively, the module 128 may identify events experienced by the device (e.g., a change in location, a scheduled event occurring, etc.) and may publish these events to one or more applications on the application platform 130.

As described in detail below, in some instances the module 128 may publish each event to the application platform 130 as a whole (and, hence, to each application 132(1)-(O)), while in other instances the module 128 may publish each event to a selected subset of the applications 132(1)-(O) on the platform 130. Further, while FIG. 1 illustrates that the application platform 130 resides locally on the device 104(1), in some instances the platform resides, in whole or in part, remotely from the device 104(1).

The applications 132(1)-(O) comprise applications that are configured to extend, enhance, or otherwise supplement the user's consumption of one or more content items. In some instances, an application on the platform 130 is associated with a particular set of content items (e.g., a particular electronic book or set of books), while in other instances an application is associated with a larger set or all content items rendered or otherwise output on the device 104(1). For instance, one of these applications may comprise a single data file that operates to supplement multiple different content items, as in the case of a dictionary or reference work that outputs definitions or other information associated with a selected work across multiple or all content items. In another instance, the application may comprise a single file associated with a single content item, such as the illustrated map 108 that may apply to the single electronic book 106 (or a number of books in the same series). In still other instances, the application may comprise multiple files that are each associated with a set of one or more content items. For instance, an application that includes notes associated with respective books may include a file for each set of notes (e.g., a file associated with book 1, another file associated with book 2, etc.)

In some instances, the user operating the device 104(1) may obtain one or more of the applications 132(1)-(O) from an application marketplace 136, which may store one or more applications 138 for purchase or for free. For instance, the user may have downloaded the application that provides the map 108 to the electronic device 104(1) from the application marketplace 136 via a client interface 140. In other instances, meanwhile, an application may be downloaded along with a particular content item, or the application (e.g., a dictionary) may be stored on the device 104(1) upon acquisition of the device by the user. In still other instances, the user operating the device 104(1) may obtain one or more of the applications 132(1)-(O) from other user devices (e.g., in a peer-to-peer manner), and/or the user may create one or more of applications 132(1)-(O) on the device 104(1) or on another device. In each of these instances, meanwhile, the applications 132(1)-(O) may be files that are separate from the corresponding content item(s) for which they provide additional content.

Regardless of the origin of the applications 132(1)-(O), the applications may receive events from the content enhancement module 128 and may determine whether to respond to the event with content to output. In order to make this determination, the applications may reference one or more pieces of context information 134. The context information may include an identity of the content item, an identity of the user operating the device 104(1), preferences of the user, a current location of the device, and the like. Further, while FIG. 1 illustrates that the applications 132(1)-(O) may access the context information 134, in other instances this context information may accompany the published events.

In either instance, the applications that receive the events may determine whether or not to provide additional content for output on the electronic device 104(1) or on another device, and/or whether to provide additional information to another one of the applications of the application platform. To do so, each application may be configured to respond to a set of predefined events and, therefore, the application may compare each published event to this set. In response to locating a match (possibly with reference to context information), the application may provide content for output and/or may provide additional information to another application of the platform. For instance, one of the applications may provide the map in response to identifying that the user has turned to a particular page that discusses physical locations within the book 106. In another example, when a first application identifies that the user has turned to the page that discusses physical locations, the first application may provide information about the physical locations to a second application, which may output the map with the additional information. In yet another example, when the user selects a word from the book 106, a dictionary may respond to an event indicating this interaction with a definition for the selected word.

As discussed in detail below, in some instances, the content enhancement module 128 may receive multiple requests to output content from multiple different applications of the platform 130. In response, the module 128 may output each piece of content, or may select a subset of one or more pieces of content to output. For instance, the module 128 may render the content (e.g., the map) or an icon that, when selected, renders the content (e.g., a selectable icon that renders the map when selected). The icon may comprise a superscripted letter or symbol, a stylization applied to a font (e.g., bold, underline, italics, text decoration, etc.), or any other type of visible marker.

In other examples, the applications of the platform may receive events that are indicative of events experienced by the electronic device. For instance, the applications may receive an event indicating a current geographical location of the device. In response, the applications may determine whether or not to respond to the event and, if so, may identify the content to provide.

Figure 2:
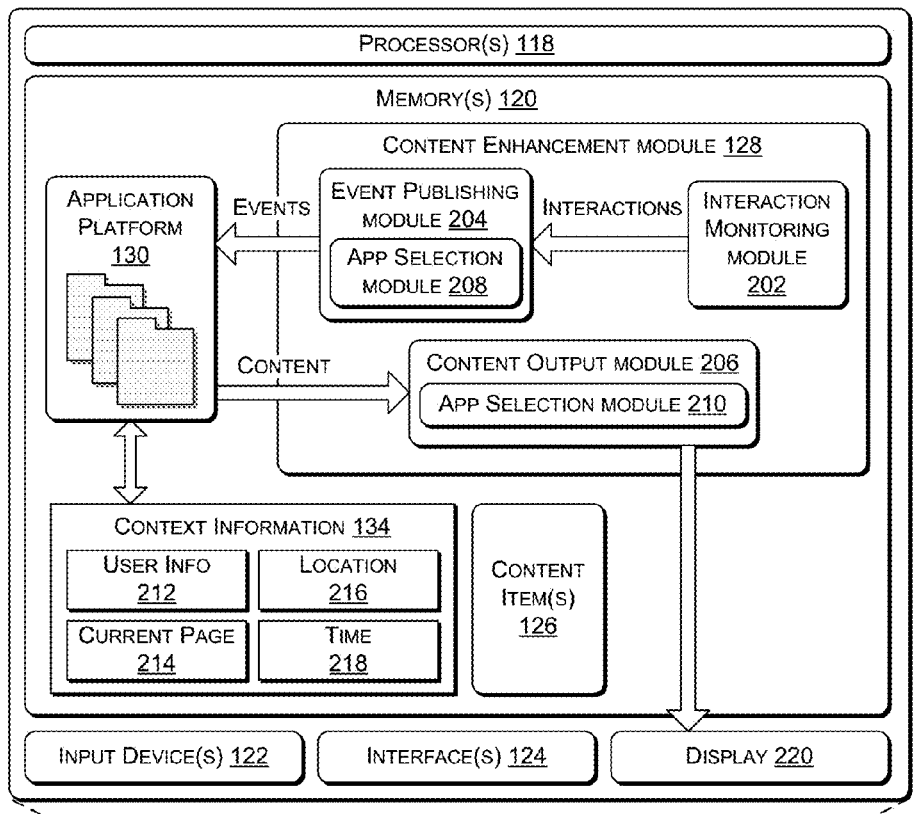
FIG. 2 illustrates the content enhancement module and other components of the electronic device from FIG. 1 in greater detail.
Figure 2:
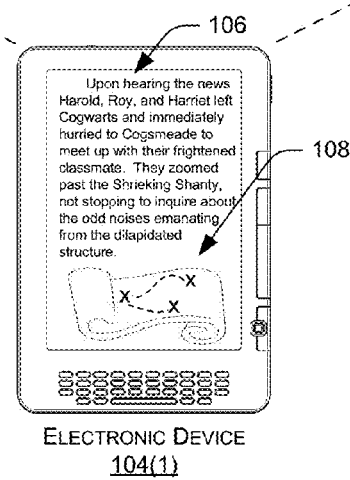

FIG. 2 illustrates the content enhancement module 128 and other components of the example electronic device 104(1) in greater detail. As illustrated, the content enhancement module 128 may include an interaction monitoring module 202, an event publishing module 204, and a content output module 206. The event publishing module 204 may include an application selection module 208, while the content output module 206 may also include an application selection module 210.

The interaction monitoring module 202 may function to monitor interactions between a user of the device 104(1) and a content item rendered on the device (e.g., the electronic book 106, a song, a movie, etc.). In response to detecting an interaction, the module 202 passes an indication of the interaction to the event publishing module 204. The module 204 functions to publish an event to one or more applications hosted by the application platform 130.

In some instances, the application selection module 208 selects a subset of the applications to publish the event to. The selected subset may be based on a variety of criteria, such as:

a type or classification of the interaction (e.g., opening a new book, a page turn, etc.);
an identity or classification of the content item;
preferences of a user consuming the content item or preferences of similar users;
past interactions between the user and content items or past interactions of similar users and content items;
capabilities of the electronic device 104(1);
whether or not the electronic device 104(1) is connected to a network;
a current location of the electronic device 104(1);
information associated with selected text;
a location in the content item at which the interaction occurs;
a current date or time;
an affinity between the content item and each of the applications on the platform 130 (as expressed by the applications and/or the content item); and
any other information associated with the content item, the applications, the interaction, or the user.

After receiving an event from the event publishing module 204, applications of the application platform 130 may determine whether or not to respond to the event and, if so, may determine content to provide for output. Before making one or both of these determinations, however, one or more of the applications may determine context associated with the interaction from the context information 134. This context information may include information associated with the user 212 (e.g., preferences of the user), a current page 214 or other location indication within the content item, a location 216 of the electronic device 104(1), a time 218 of day or a date, and/or any other similar or difference pieces of information. In order to receive this context information, in some instances the applications may call one or more application programming interface exposed by the device 104(1).

After receiving the event and referencing the context information 134, one or more of the applications 132(1)-(O) may provide a request to display content to the content output module 206. In response, the content output module 206 may then provide the content for output on a display 220 or other output device (e.g., speakers, etc.) of the electronic device 104(1).

Before doing so, however, the application selection module 210 may select a subset of the received content to provide for output on the display 220. For instance, if the content output module 206 receives ten requests to cause display of ten pieces of content from respective applications, the application selection module 210 may select a subset (e.g., one, three, etc.) to provide to the display 220. This selection may be based on the same or similar criteria as described above with reference to the application selection module 208. It is noted that while FIG. 2 illustrates both the application selection module 208 and the application selection module 210, in some instances the content enhancement module 128 may include one or the other, or may not include either module.

Of course, while the application selection module 210 may select less than all of the received pieces of additional content for output as discussed above, in some instances the module 210 may select each received piece of content for output. Furthermore, in instances where the content output module 206 outputs multiple pieces of additional content, the module 206 may layer this content to allow a user of the device 104(1) to toggle through the different layers and, hence, through the additional content. In other instances, meanwhile, multiple pieces of layered additional content may work in unison with one another. For instance, a first layer of additional content may mask a misspelling of a word, while another layer of additional content that includes the correct spelling of the word may be rendered atop the masked portion of the display.

Furthermore, in each instance, the number of selected applications may vary based on the certainty of which application is the "correct" application to respond to the event. For instance, if a user operating the device clearly highlights a word in the electronic book 106 and is clearly looking for a definition of the word, then the application selection module 208 may publish this event exclusively to the dictionary application, and/or the application selection module 210 may exclusively output the content exclusively from the dictionary application. However, in instances where the interaction may elicit responses from multiple different applications, the application selection module 208 may publish the event to a relatively large number of applications, and/or the application selection module 210 may provide content to the display from a relatively large number of applications. In these instances, the content output module 206 may, for instance, output a selectable list of multiple available pieces of content. In response to receiving a selection of a particular piece of content on the list from the user, the module 206 may output that particular piece of content.

While the applications 132(1)-(O) may provide any sort of visual, audible, tactile, or other type of content for output on the electronic device 104(1), some example applications and content provided thereby may include the following:

- A dictionary application that provides definitions of selected words;
- A thesaurus application that provides synonyms and/or antonyms of selected words;
- A translation application that provides translations of selected words and/or phrases;
- An annotation application that provide user annotations in response to an event indicating that a user has selected certain text (e.g., private annotations, public annotations, group/classroom annotations, popular annotations, an author's annotations, etc.);
- A position application that provides a page number or other location indicator in a content item;
- A table-of-contents, index, or search application;
- A corrections application that provides corrections to a content item (e.g., author corrections, personal corrections, crowd-sourced corrections, etc.);
- An application provides notes from subject matter experts;
- A quiz application that provides a quiz at certain locations in a content item (e.g., at the end of a chapter, end of a book, etc.);
- A social networking application that provides a status update in response to a user selecting a piece of text;
- A browser application that provides content associated with selected links; and
- Any other application that provides any sort of content that enhances a user's consumption of an underlying content item.

In some instances, the content provided by an application may overlay onto a content item, may appear in a whitespace of the content item, or may require selection of an icon by a user to view the content. In the latter instances, the icon may comprise an underline of a particular piece of text, an "info" icon above the appropriate text, or the like. In response to a user activating the icon, the content output module 206 or another module may output the content (e.g., the map illustrated in FIG. 1, etc.). Furthermore, some applications that have applicability to multiple different content items may have content that is authored by different users. For instance, a first user may author the quiz application described in the list above, while other users may actually author quizzes associated with different respective content items.

Example Content

Enhancement Processes

Figure 3A:
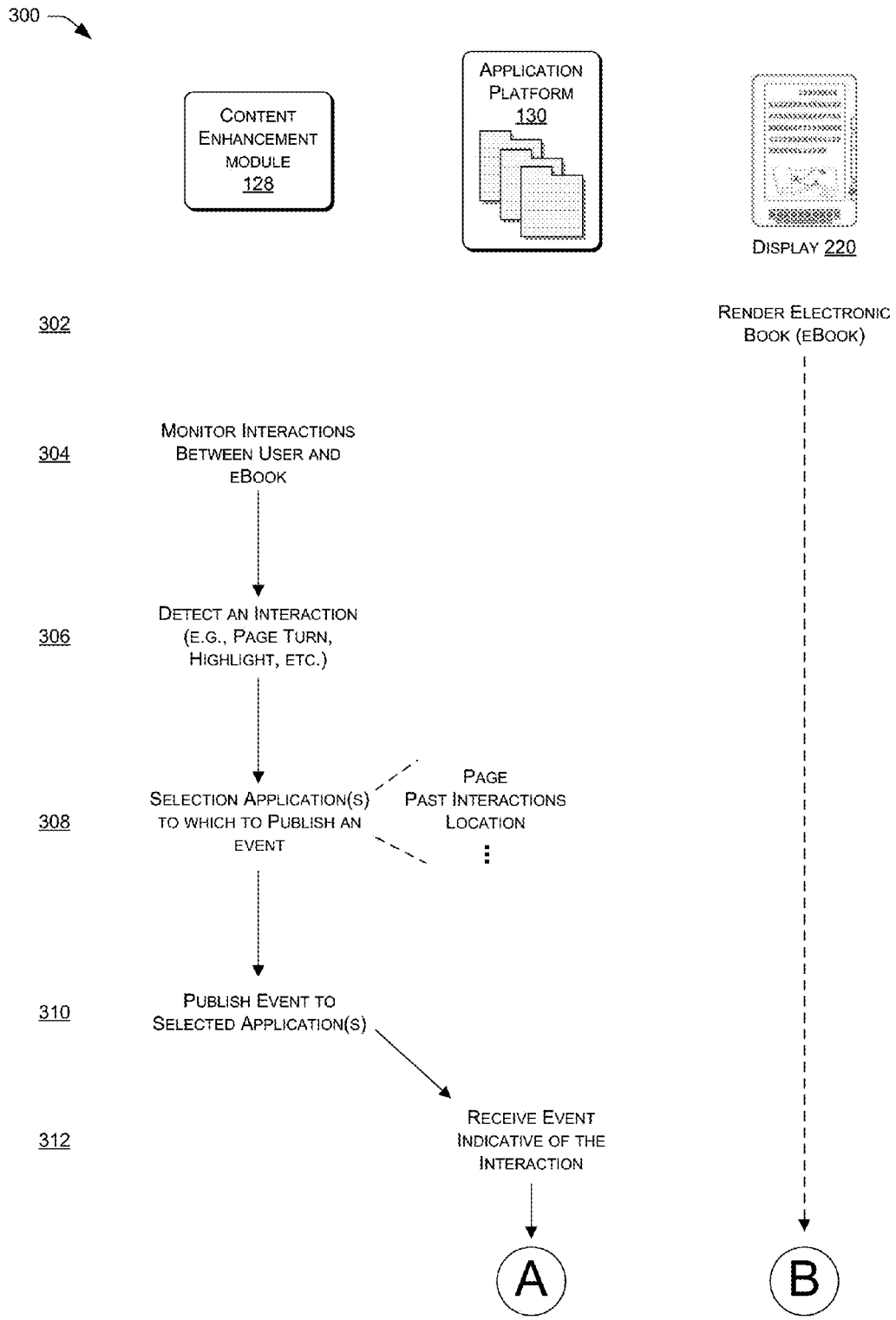
FIG. 3A-3C is a flow diagram of an example process that includes a user consuming and interacting with an electronic book. In response to detecting these interactions, the illustrated content enhancement module publishes events to one or more applications of the application platform, which in turn provide additional content for rendering with the electronic book.
Figure 3B:
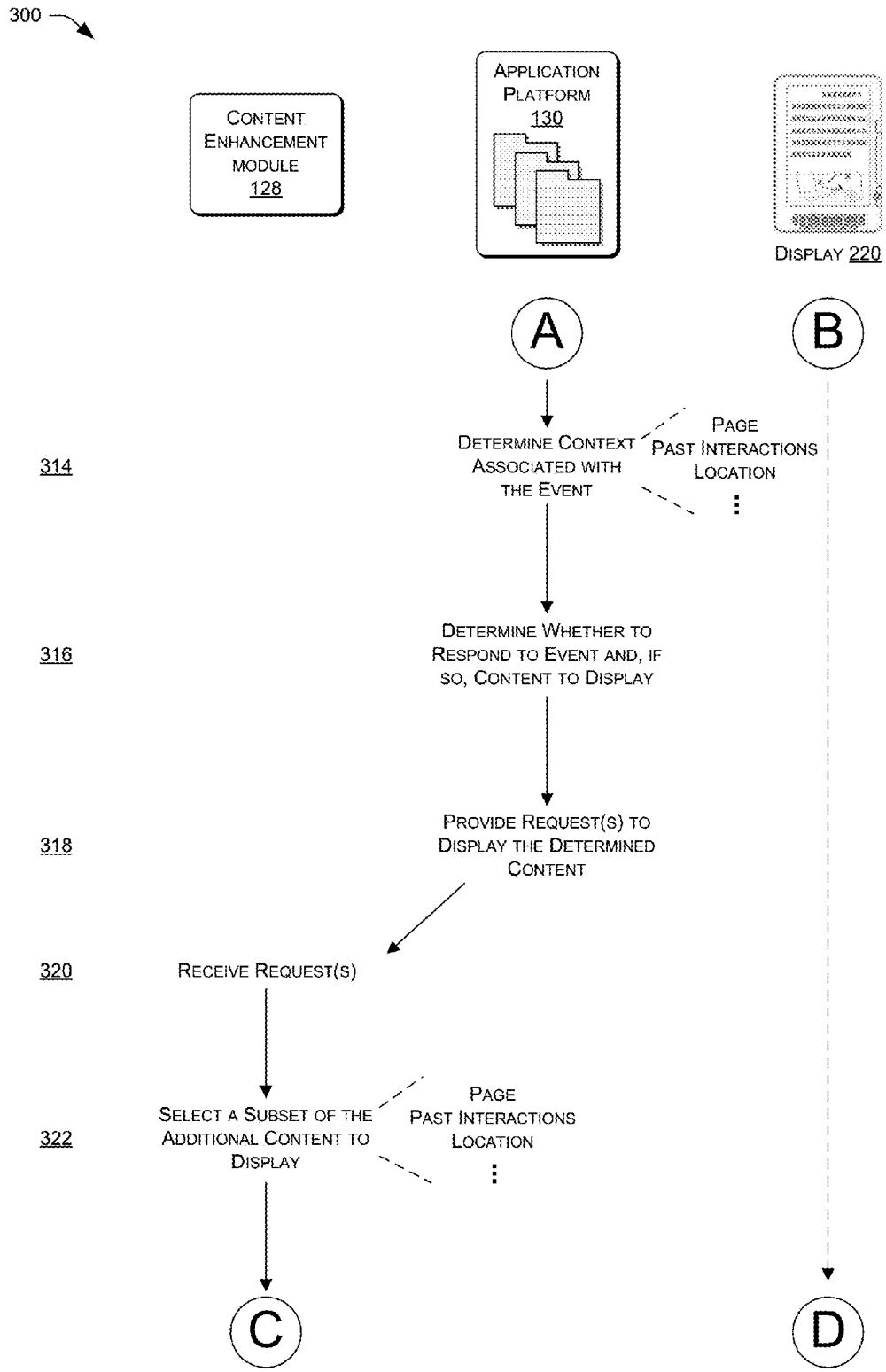
Figure 3C:
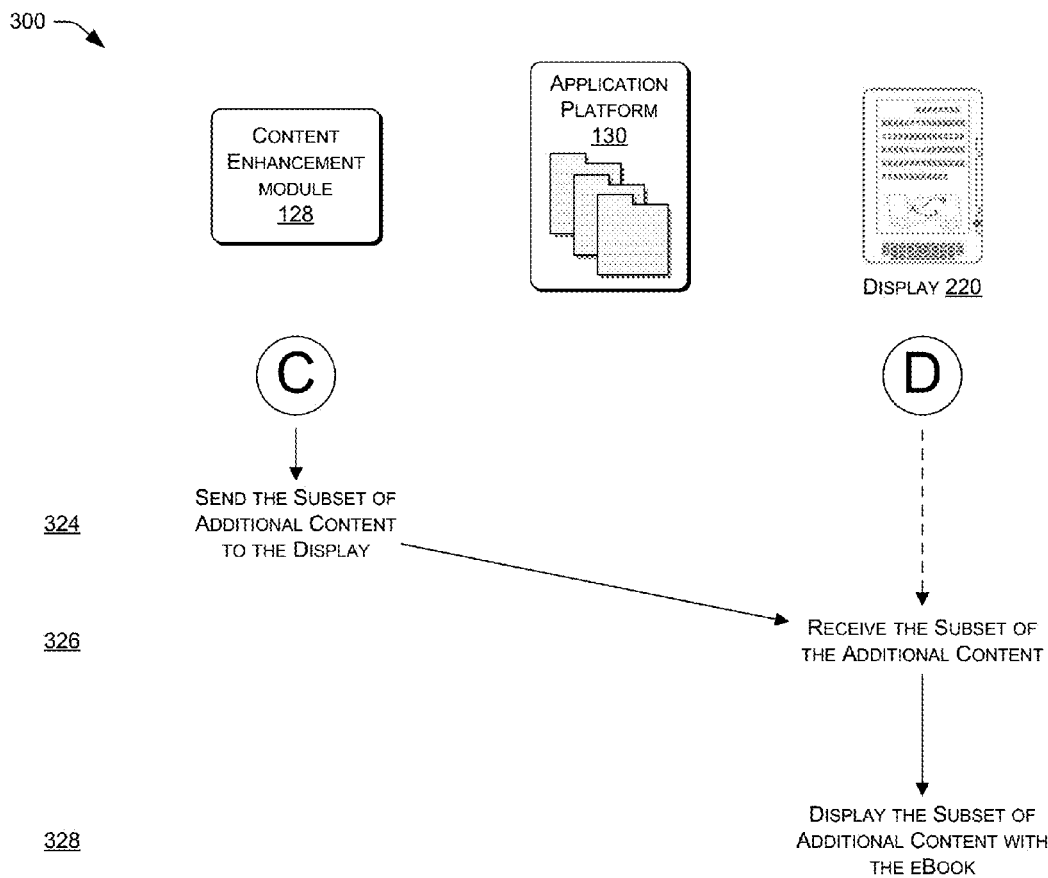

FIG. 3A-3C is a flow diagram of an example process 300 for extending or enhancing content that is being rendered on an electronic device, such as the device 104(1) of FIG. 1. Each of the processes described herein is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The process 300 includes, at 302, the display 220 of the electronic device 104(1) rendering an electronic book, such as the example electronic book 106 of FIG. 1. While the process 300 describes rendering an electronic book, it is to be appreciated that other embodiments may employ other types of content items. At 304, the content enhancement module 128 begins monitoring interactions between a user operating the device 104(1) and the rendered electronic book. At 306, the module 128 detects such an interaction, such as the user turning a page, highlighting or otherwise selecting text, or the like.

In response to detecting this interaction, the content enhancement module 128 may select, at 308, one or more applications of the application platform to which to publish an event indicative of the interaction. As discussed above, this selection may be based on one or more pieces of criteria, such as a page to which the user turns, past interactions or behavior of the user, a location of the device, and/or other types of context associated with the event. At 310, the content enhancement module 128 proceeds to publish the events to the selected applications and, at 312, these applications receive the event indicative of the interaction.

FIG. 3B continues the illustration of the process 300. At 314, the applications of the platform may determine one or more pieces of context associated with the event, which may or may not accompany the event itself. With use of this information, the applications may determine whether or not to respond to the event and, if so, which content to display or otherwise output at 316. At 318, each application that determines to respond to the event provides a request to display or otherwise output its determined content to the content enhancement module 128, which receives the requests at 320. At 322, the content enhancement module 128 may select a subset of this "additional" or "supplemental" content to render on the display 220.

FIG. 3C continues and concludes the process 300 and includes, at 324, the content enhancement module 128 sending the selected subset of the additional content for rendering on the display 220. At 326, the display 220 receives this subset of content and, at 328, renders the additional content on the display with the electronic book. This may include outputting one or more selectable icons associated with the content, or directly outputting the content itself. For instance, in response to the user turning to a particular page of the electronic book 106, the display 220 may receive and output the example map illustrated in further detail in FIG. 1, or an icon that, when selected, causes rendering of the map.

Figure 4:
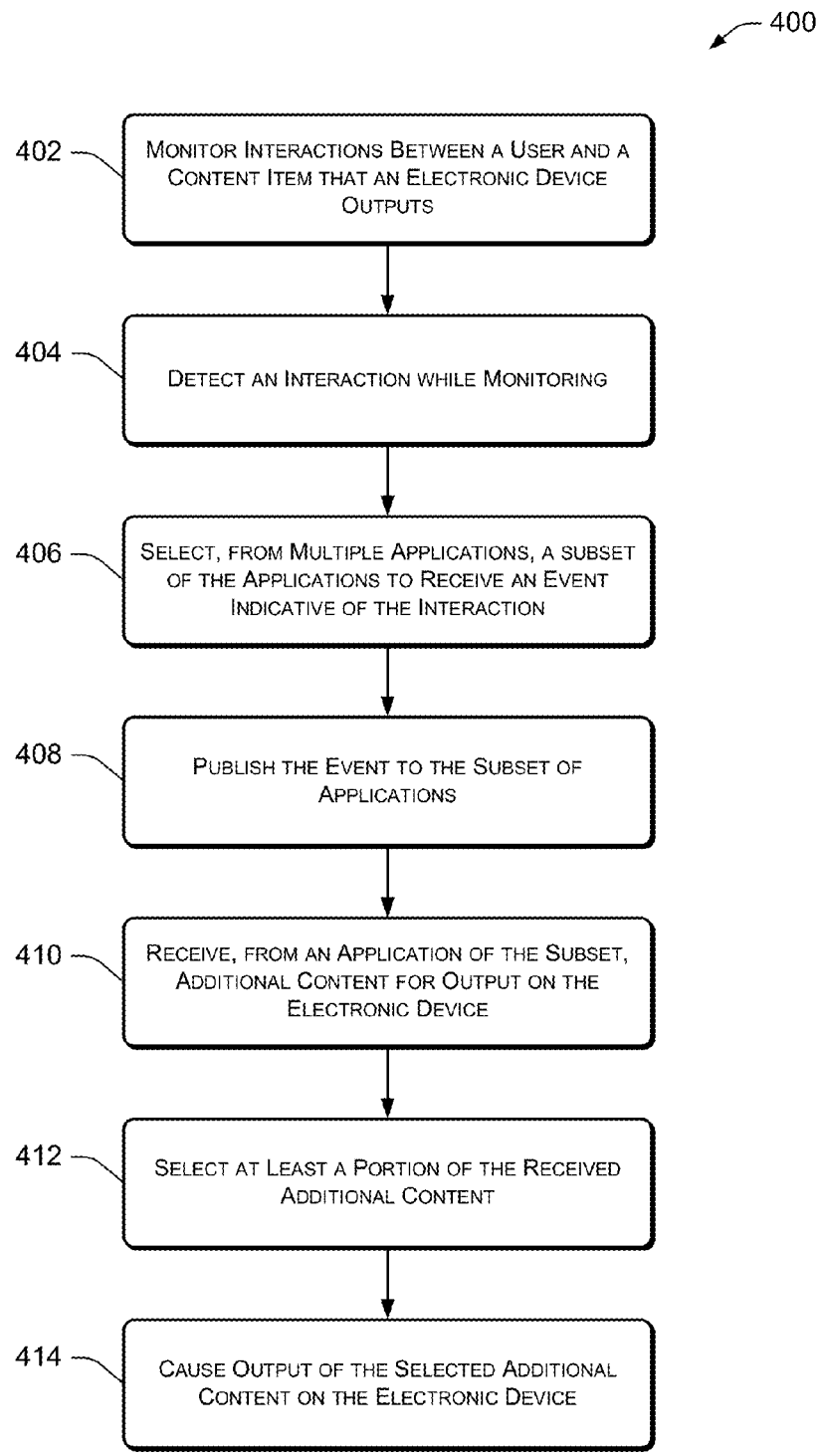
FIG. 4 is a flow diagram of an example process that the content enhancement module may perform for enhancing content being rendered on the electronic device of FIG. 1.

FIG. 4 is a flow diagram of an example process 400 that the content enhancement module 128 may perform for enhancing content being rendered on the electronic device 104(1). At 402, the module 128 may monitor interactions between a user and a content item that an electronic device outputs. At 404, the module 128 detects an interaction while performing the monitoring. At 406, the module 128 selects, from multiple different applications, a subset of the applications to receive an event indicative of the detected interaction. At 408, the module 128 then publishes the event to the subset of applications and, at 410, the module 128 receives additional or supplemental content from these applications for output on the electronic device. Then, at 412, the module 128 may select a subset of this content to provide for output on the device. Finally, at 414, the module 128 causes output of the selected additional content on an output component of the electronic device.

Figure 5:
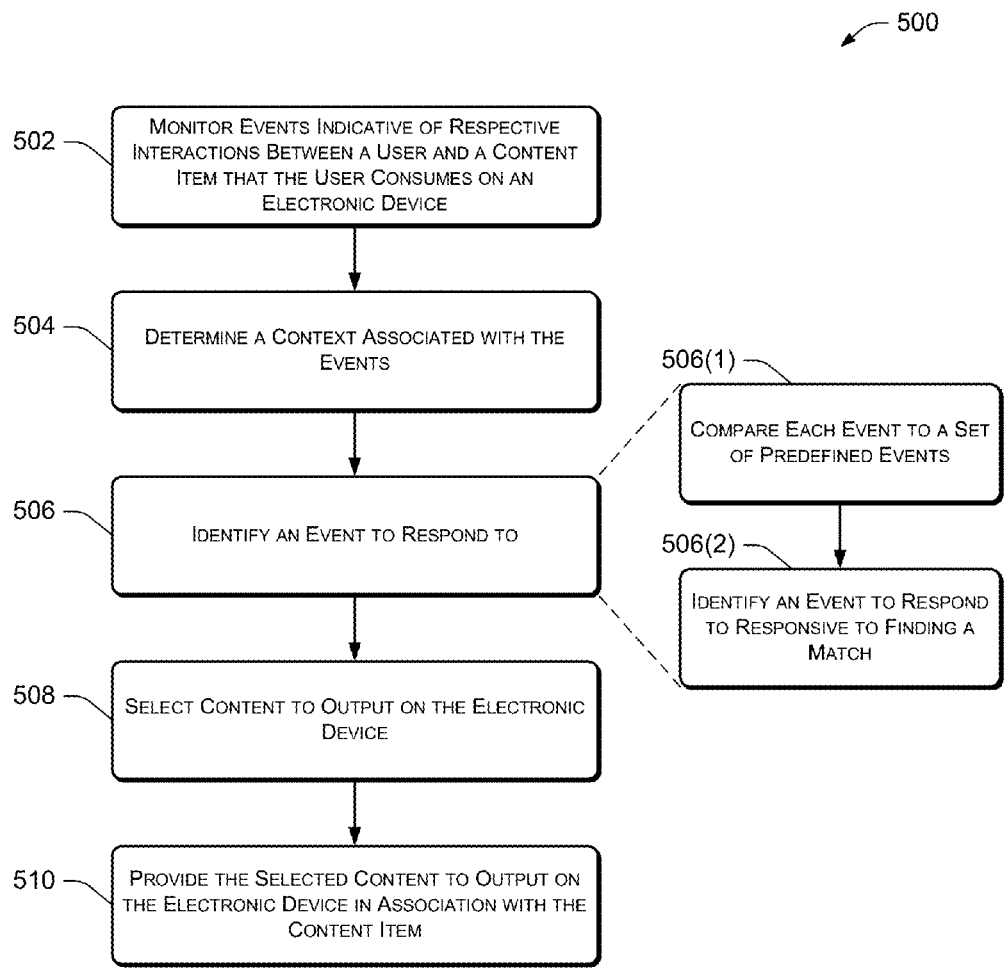
FIG. 5 is a flow diagram of an example process that an application of the application platform may perform for enhancing content being rendered on the electronic device of FIG. 1.

FIG. 5 is a flow diagram of an example process 500 that an application of the application platform 130 may perform for enhancing content being rendered on the electronic device 104(1). At 502, the application may monitor published events that are indicative of respective interactions between a user and a content item that the user consumes on an electronic device. At 504, the application determines a context associated with each of the events, which may comprise one or more pieces of the context information described above.

At 506, the application may identify an event to respond to based at least in part on the event itself and, in some instances, based at least in part on the determined context associated with the event. The operation 506 may include, at 506(1), comparing each of the events to a set of predefined events that the application is configured to respond to. The operation 506 may also include, at 506(2), identifying an event to respond to in response to determining a match between the published event and an event from the set of predefined events associated with the application. In some instances, the application may also make this match based at least in part on the determined context information.

At 508, the application may select content to output on the electronic device. For instance, if the application is a dictionary application and the event indicates that the user selected a particular word of an electronic book, then the application may select a definition for the selected word. Finally, at 510, the application may provide the selected content to output on the electronic device.

Example Content

Item Correction Architecture

Figure 6:
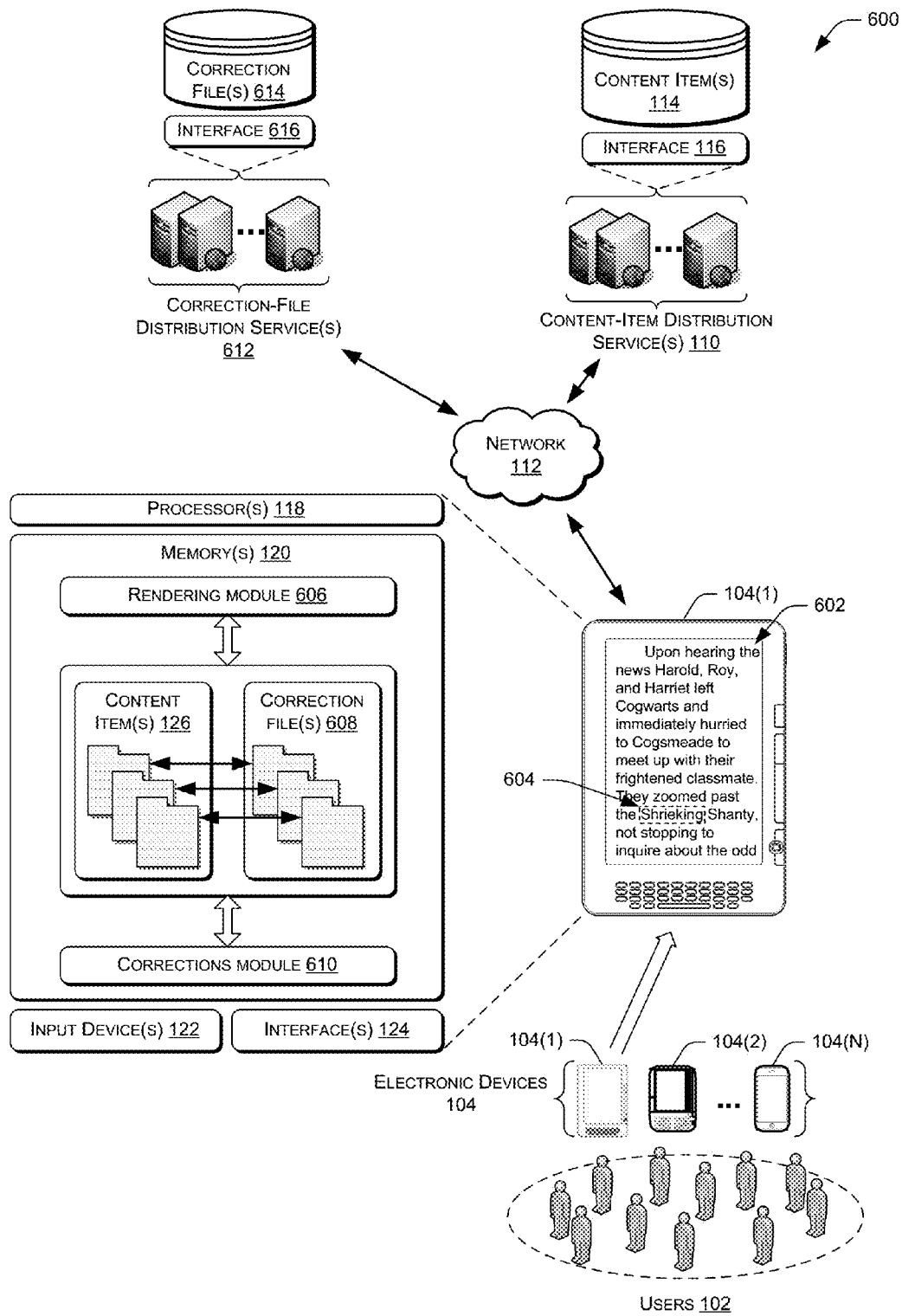
FIG. 6 illustrates an example architecture in which an electronic device stores one or more corrections files associated with respective content items. When rendering a content item, a rendering module may substitute content from the corrections file for corresponding content in the content item.

FIG. 6 illustrates an example architecture 600 in which the example electronic device 104(1) described above stores or has access to one or more corrections files associated with respective content items. When rendering a content item, a rendering module may substitute content from the corrections file for corresponding content in the content item.

In the example of FIG. 6, the electronic device 104(1) renders a particular electronic book 602. Again, while FIG. 6 illustrates an electronic book, in other instances these techniques may apply to other types of content items, such as songs, movies, and the like. In this example, the electronic book 602 is rendered on the display of the device with a correction that has been made to a word within the book. Specifically, the display includes an indication 604 that that word "shrieking" has been corrected before being rendered on the display 220 of the device 104(1). For instance, the file associated with the illustrated electronic book may include the misspelling "shreiking", which has been corrected on the display of the device.

In order to correct this example misspelling, the device 104(1) includes a rendering module 606 and one or more corrections files 608, each of which may be associated with one or more particular content items 126 stored on or otherwise accessible to the electronic device 104(1). Each of the corrections files 608 may include one or more corrections or other types of substitutions that are to be made at the time of rendering a corresponding content item. For instance, the correction file 608 associated with the electronic book 602 may include a request to substitute the misspelling "shreiking" with the proper spelling "shrieking". For instance, the file may request to substitute each instance of the misspelling with the properly spelled word.

In some instances, the corrections files 608 are separate from corresponding files that store contents of the associated content items. As such, any corrections within the corrections file do not modify the actual content item itself. Instead, when as a user consumes a particular item (e.g., reads a particular electronic book) and reaches a location in the content item that includes a portion that the corrections file indicates should be substituted (e.g., a misspelling), the rendering module 606 may render the content item and the correction/substitution at the same time. By doing so, the rendering module 606 displays or otherwise outputs the corrected/substituted text without modifying the underlying content item itself.

In some instances, the corrections files 608 may operate in the architecture of FIG. 1, while in other instances they may not. That is, while corrections may be made by responding to "events", these corrections may also be implemented using other functionality.

In some instances, a user operating the device 104(1) may request to make corrections to the electronic book 602 as the user reads the book 602 on the device 104(1). As such, the memory 120 may store a corrections module 610 that allows the user to make such correction or other substitution requests. For instance, in response to seeing the misspelling "shreiking", the user may select this word and request to correct the spelling. In response to making a request, the corrections module 610 may output a text box to allow the user to insert what she believes is the proper spelling. Then, the corrections module 610 may store this correction in the corresponding corrections file, or may provide this requested correction to a predefined authoritative source for determining the accuracy of the correction. For instance, as users read books, such as the book 602, a central service may compile and crowd-source the requested corrections. As changes are determined to be accurate, they may be stored in an authoritative corrections associated with the particular electronic book or other content item.

In other instances, meanwhile, a user may store his or her own corrections file locally without regard to whether or not these corrections have been "approved" by an authoritative source. Furthermore, in some instances the user may also receive one or more corrections files from a corrections-file distribution service 612. This service 612 may store multiple different corrections files 608, associated with respective electronic books or other content items. As such, the user operating the electronic device 104(1) may choose to download one or more corrections files via a client interface 616 provided by the service 614. These corrections files may include corrections made by an author of the electronic book 602, other readers of the electronic book 602, or the like. While the user may request to download these files, in some instances the service 612 may push approved or authoritative corrections files to each device that stores a copy of a particular electronic book, potentially without receiving requests from users of these devices.

Regardless of the origins of the corrections within a particular corrections file, the rendering module 606 may receive an indication when the electronic device desires to render the electronic book 602 at the request of the operating user. In response, the rendering module 606 may determine a location of the electronic book 602, as well as whether the corrections file(s) stored on the device 104(1) and associated with the book 602 indicates that correction(s) should appear at the to-be-rendered location. If so, then the rendering module renders both the content of the electronic book 602 at the appropriate location, as well as any corrections made within that location. For instance, the module 606 may substitute the word "shreiking" for the word "shrieking". By doing so, the user views the correction without modifying the actual electronic book 602 itself. In order to substitute this text at a time of rendering, the rendering module 606 may actually overlay the correct spelling of shrieking atop the electronic book 602 in some instances.

In other instances, meanwhile, the electronic book may comprise a formatting skeleton and multiple fragments for insertion into the formatting skeleton, as described in U.S. patent application Ser. No. 12/892,771, filed on Sep. 28, 2010 and entitled "Fragmentation of Structured Language Data", which is incorporated herein by reference in its entirety. Here, the formatting skeleton of the electronic book 602 specifies formatting information for the electronic book, while the multiple fragments include the actual presentation data of the electronic book (e.g., text, illustrations, etc.). The fragments may represent differently sized portions of the electronic book, such as a paragraph of the book, a sentence of the book, or even a word of the book.

In these instances, the corrections files 608 may themselves comprise fragments for insertion into the formatting skeleton at a particular location, either in addition to or in lieu of a particular fragment of the electronic book 602. For instance, envision that the electronic book includes a fragment corresponding to a paragraph that includes the misspelling "shreiking", and that the corrections file associated with the electronic book 602 includes a fragment that comprises the same paragraph, with the exception being that this fragment includes the proper spelling of "shrieking". In addition, this fragment may indicate that it is to be inserted into the formatting skeleton in lieu of the fragment that includes the misspelled term. As such, when the rendering module 606 receives an indication that the electronic device wishes to render the electronic book 602, the rendering module may substitute the fragments when the user reaches that particular location of the electronic book. Again, by substituting fragments in this manner, the user is able to view the corrected version of the word "shrieking" without actually modifying the actual electronic book itself. Furthermore, in addition or in the alternative to substituting or adding fragments, in some instances the corrections file may include an instruction to remove an existing fragment of the electronic book without inserting a fragment in its place.

As FIG. 6 illustrates, the rendering module 606 may display an indication 604 when the module 606 displays a correction from one of the corrections files 608. For instance, FIG. 6 illustrates that the rendering module 606 has rendered a dotted box around the corrected use of the term "shrieking". Of course, while FIG. 6 illustrates one example indication 604, other embodiments may employ other types of indications, such as a flag, italicized text, underlined text, and the like.

Furthermore, in instances where requested corrections are crowd sourced or otherwise verified before being integrated into a corrections file, the rendering module 606 may use these indications as a communication tool for communicating the state of the correction to the user. For instance, when the user requests to make a correction, but before the validity of the correction is verified, the rendering module 606 may render an "S" above the alleged mistake, indicating to the user that the requested correction has been submitted for approval. Furthermore, when the correction is accepted, the rendering module 606 may render a "C" for corrected or an "A" for accepted. Furthermore, if the user requests to make a correction that is ultimately rejected, the rendering module 606 may render an "R", indicating this rejection. Of course, while a few examples have been discussed, it is to be appreciated that other indications may be used in other instances.

While the above discussion has focused on making corrections to misspellings and grammatical errors, these corrections files 608 may cause any type of text or other content to be substituted upon rendering of a corresponding content item. For instance, these files 608 may include substitutions for vulgar or socially unacceptable words in some instances. That is, the user of the device 104(1) or another entity may request to substitute, within the electronic book 602, a particular word that is considered vulgar with a less vulgar synonym. As such, the rendering module 606 may make this substitution throughout the electronic book 602 as the user reads the book on the electronic device 104(1). The rendering of the electronic book 602 with this corrections file may result in rendering a censored version of the electronic book. As described above, while the user may view these changes on the device 104(1), these changes will not alter the contents of the underlying file storing the electronic book 602 itself.

In this regard, envision that a teacher wishes to substitute a particular vulgar term for a less vulgar term in each copy of the electronic book 602 that the teacher's students read. To do so, the teacher may make the change in a particular corrections file and then may provide this corrections file to each of her students' devices. Then, when each of her students open their copy of the book on their respective device, the rendering module 606 on that particular device will render the book along with the changes made by the teacher.

In one specific example, the teacher could operate an electronic device to request to make one or more changes to particular electronic book or other content item. For instance, the teacher could access a website hosted by the corrections-file distribution service 612 to request to create a corrections file that censors an undesirable term (or terms). In addition, the teacher may provide an identification of each of her students' devices, identifications of their copies of the electronic book 602, or identifications of the students themselves. In response, the distribution service 612 may push this corrections file to each of the student devices, such that these devices render the censored version of the electronic book. Of course, while this example describes a teacher/student group, it is to be appreciated that these techniques apply equally to any other type of group, such as a reading club, a church, or any other organized or unorganized community. In each instance, an authority figure may have the authority to provide these corrections files to the devices of the group. Further, while these techniques are described with reference to creating a censored version of a content item, these corrections files may alter the rendering of the content item in any other manner.

In some instances, the rendering of the electronic book 602 or other content item with the corresponding corrections file 608 may be dependent on other factors, such as a user operating the device 104(1), a location of the device 104(1), or the like. For instance, when a father of a family authenticates with the device 104(1) and requests to render the electronic book 602, the rendering module 606 may refrain from rendering the censored changes from the corrections file. However, when a younger son or daughter of the family authenticates with the device and makes the same request, the rendering module 606 may render the electronic book 602 along with the censored changes from the corrections file 608.

In yet another example, the corrections file 608 may be associated with a particular location or set of locations. For instance, in the teacher/student example, the teacher (or other authority source) may associate the corrections file 608 with the geolocation corresponding to the school where the teacher and students gather for class. Therefore, when the students request to render the electronic book 106 on their respective devices 104 while at school, the rendering module 606 may render the book along with the censored changes to the book. When these students make the same request at home, however, the rendering module 606 may render the electronic book 602 without reference to the corrections file 608.

Example Content Item Correction Processes

Figure 7:
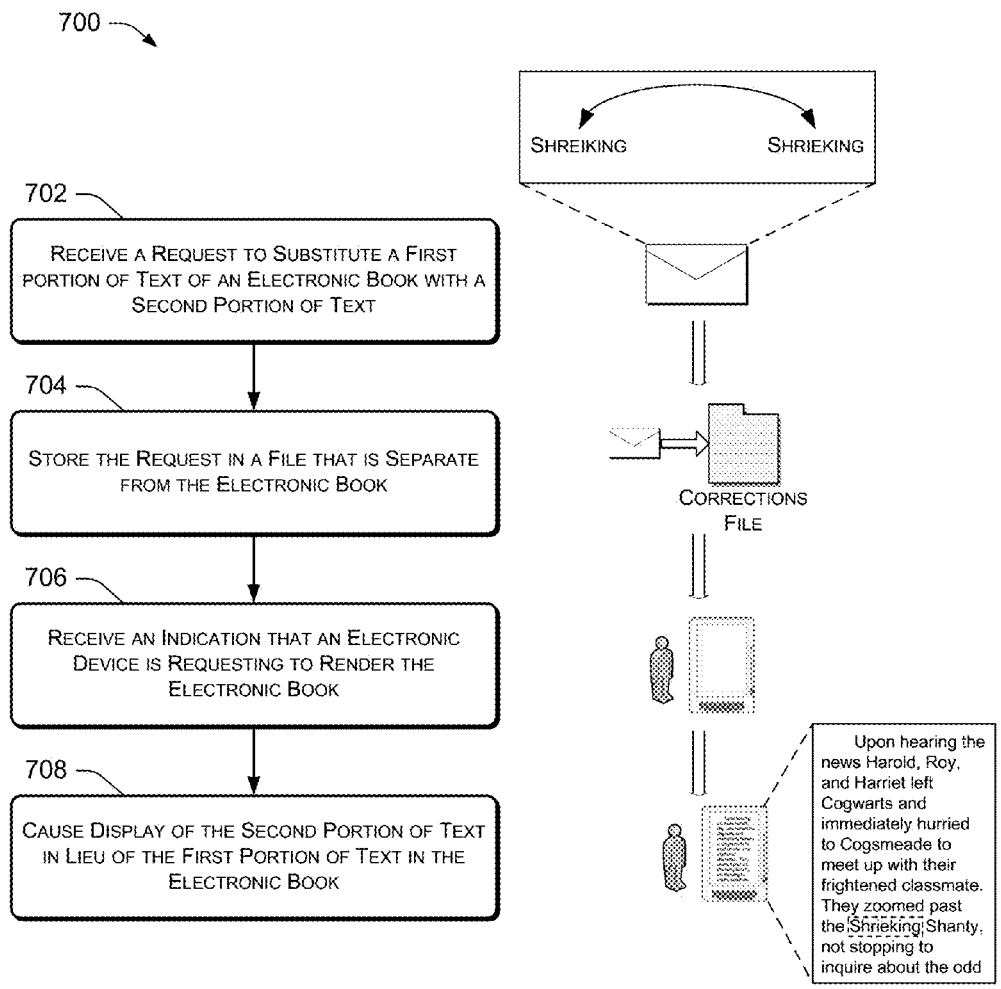
FIG. 7 is a flow diagram of an example process that the rendering module may perform for receiving and storing substitutions (e.g., corrections) to a content item that a user consumes on the electronic device of FIG. 6. This process also includes the module causing display of the substituted text when the user later requests to render the content item on the electronic device.

FIG. 7 is a flow diagram of an example process 700 that the rendering module 606 or another module may perform in whole or in part. At 702, the rendering module 606 may receive a request to substitute a first portion of text of an electronic book with a second portion of text. For instance, a user operating the electronic device 104(1), an author or publisher of the electronic book 602, or another entity may request to substitute the term "shreiking" with the term "shrieking" with the electronic book 602. While this example comprises a user requesting to correct a misspelling, in other instances this request may be a request to substitute text for any other reason. For instance, a user that desires to learn a new language (e.g., Spanish) may request to substitute particular English words or phrases for translated Spanish words or phrases.

At 704, the rendering module 606 may store this request in a file that is separate from the electronic book to which it is associated with. At 706, the rendering module 606 receives an indication that an electronic device that stores or otherwise has access to the corrections file is requesting to render the corresponding electronic book. At 708, the rendering module causes display of the second portion of text in the electronic book in lieu of the first portion of text. For instance, the rendering module 606 may substitute each use of the term "shreiking" with the term "shrieking". By substituting the text in this manner, the techniques display the requested substitution without modifying the file storing the contents of the electronic book or other content item.

Figure 8:
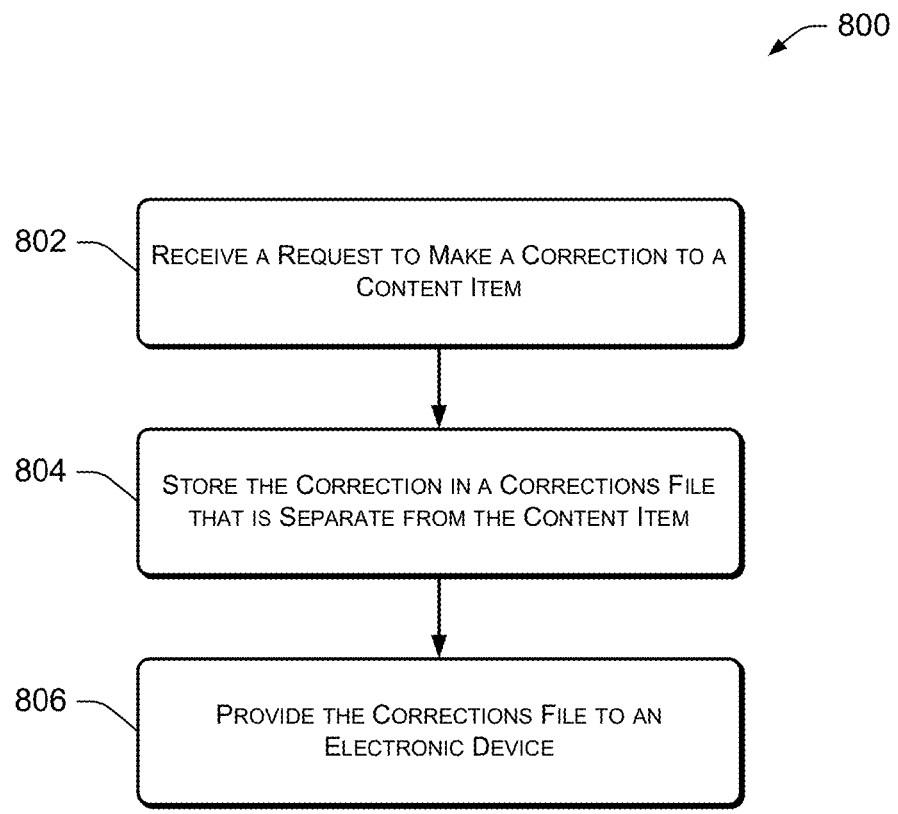
FIG. 8 is a flow diagram of an example process for receiving and storing, in a corrections file, a request to correct a content item. This process also includes providing the corrections file to an electronic device. In some instances, the corrections file is separate from a content item associated with the corrections file.

FIG. 8 is a flow diagram of an example process 800 for receiving and storing a request to correct a content item in a corrections file, and for providing the corrections file to an electronic device. At 802, a request to make a correction to a particular content item is received. This request may be received from a user, either at an electronic device that the user operates or at a device (e.g., a server) that is remote from an electronic device that the user operates. At 804, the requested correction is stored in a corrections file that is separate from the content item to which the correction pertains. At 806, the corrections file is provided to an electronic device such that when the device renders the content item, the device is able to render the correction along with the content item, possibly without modifying the content item itself. The corrections file may be provided to a local or remote electronic device.

Example Electronic Book Reader

Figure 9:
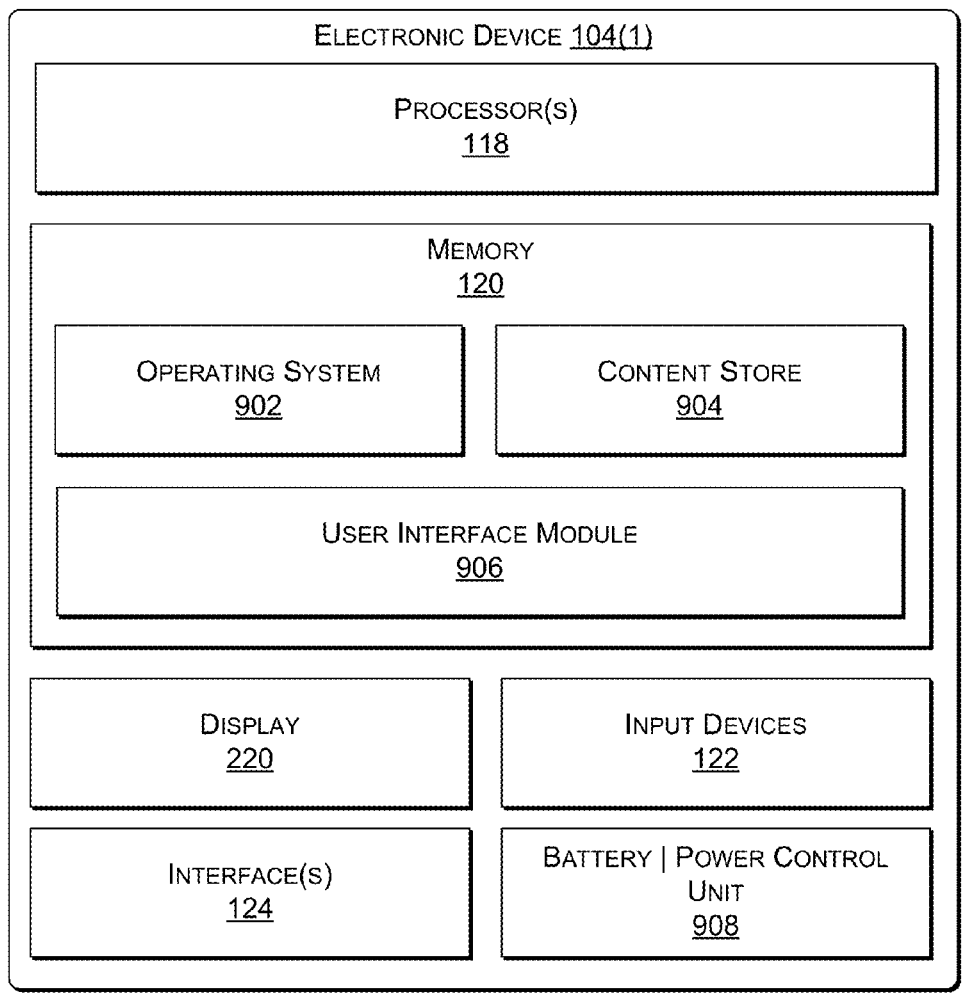
FIG. 9 is a block diagram showing an example of an electronic device, which may comprise an electronic book reader in some embodiments.

FIG. 9 is a high-level block diagram showing an example of the electronic device 104(1), which comprises an electronic book reader in some examples. In this embodiment, the electronic device 104(1) is a dedicated eBook reader device, designed specifically for the purpose of emulating a traditional book-like reading experience. To that end, it is has a size and weight that is comparable to a paper-based book, and uses a monochrome display having a contrast ratio that approaches that of the printed page. For brevity sake, components described above in detail (e.g., the content enhancement module 128, the application platform 130, the rendering module 606, etc.) are not described below. However, it is to be appreciated that the electronic device 104(1) may include one or a combination of these components, as described in detail above.

In a very basic configuration, the electronic device 104(1) includes one or more processors 118 and memory 120, as described above. Depending on the configuration of the electronic device 104(1), the memory 120 may be a type of computer storage media and may include volatile and non-volatile memory. Thus, the memory 120 may include, but is not limited to, RAM, ROM, EEPROM, flash memory, or other memory technology, or any other medium which can be used to store media items or applications and data which can be accessed by the electronic device 104(1).

The memory 120 may be used to store any number of functional components that are executable on the processors 118. In many embodiments, these functional components comprise instructions or programs that are executable by the processors 118 and that implement operational logic for performing the actions attributed above to the electronic device 104(1). In addition, the memory 120 may store various types of data that are referenced by executable programs.

The memory 120 may store an operating system 902 and a content store 904 to store one or more content items, annotations, and the like. A user interface (UI) module 906 may also be provided in the memory 120 and executed on the processors 118 to provide for user operation of the electronic device 104(1). The UI module 906 may provide menus and other navigational tools to facilitate selection and rendering of content items. The UI module 906 may further include a browser or other application that facilitates access to sites over a network, such as websites or online merchants, or other sources of electronic content items or other products.

The electronic device 104(1) may further include the display 220 upon which electronic books and/or other content items are rendered. In one implementation, the display 220 uses electronic paper display technology. In general, an electronic paper display is one that has a high resolution (150 dpi or better) and is bi-stable, meaning that it is capable of holding text or other rendered images even when very little or no power is supplied to the display. The electronic paper display technology may also exhibit high contrast substantially equal to that of print on paper. Some example electronic paper displays that may be used with the implementations described herein include bi-stable LCDs, MEMS, cholesteric, pigmented electrophoretic, and others. One example electronic paper display that may be used is an E Ink-brand display. Touch sensitive technology may be overlaid or integrated with the electronic paper display technology to enable user input via contact or proximity to the screen.

The electronic device 104(1) may further be equipped with various input devices 122. Such devices may include various user interface controls (e.g., buttons, joystick, keyboard, etc.), microphones, connection ports, and so forth.

One or more network interfaces 124 may support both wired and wireless connection to various networks, such as cellular networks, radio, WiFi networks, short range networks (e.g., Bluetooth), IR, and so forth. The network interfaces 124 facilitate receiving electronic books and other content items as described herein.

The electronic device 104(1) may also include a battery and power control unit 908. The power control unit operatively controls an amount of power, or electrical energy, consumed by the electronic reader. Actively controlling the amount of power consumed by the electronic reader may achieve more efficient use of electrical energy stored by the battery.

The electronic device 104(1) may have additional features or functionality. For example, the electronic device 104(1) may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

CONCLUSION

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implementing particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

We claim:
1. An electronic device comprising:
a display;
one or more processors;
memory storing an electronic book; and
a rendering module, stored in the memory and executable on the one or more processors, to:
render a portion of the electronic book on the display;
monitor interactions between a user and the portion of the electronic book;
based at least in part on the monitoring, notify an application that an event occurred, the application executable on the one or more processors to:
determine context information associated with the portion of the electronic book, the context information including a current location in the portion of the electronic book associated with at least one of the interactions;
receive, from a server, an indication that additional content previously created by the user and associated with the electronic book is available, the additional content corresponding to the current location, wherein the additional content is pre-validated by at least one of an authoritative source or crowdsourcing; and
receive, by the one or more processors, from the server, the additional content; and render at least a portion of the additional content along with the portion of the electronic book.

2. An electronic device as recited in claim 1, wherein the electronic book and the additional content comprise two discrete files, each of the two discrete files stored within the memory of the electronic device.

3. An electronic device as recited in claim 1, wherein one or more corrections included in the additional content do not modify the electronic book stored in the memory of the electronic device.

4. An electronic device as recited in claim 1, wherein:
the context information associated with the electronic book includes a current geographic location of the electronic device; and
the application is executable by the one or more processors to display a map that includes the current geographic location.

5. An electronic device as recited in claim 1, the rendering module executable on the one or more processors to:
render a portion of a second electronic book on the display;
monitor interactions between the user and the portion of the second electronic book; and
receive, from the server, a corrections file that includes a correction to the portion of the second electronic book; and
render the correction to the portion of the second electronic book.

6. An electronic device as recited in claim 1, wherein the rendering module overlays one or more corrections from the additional content atop the portion of the electronic book when rendering the portion of the electronic book on the display.

7. An electronic device as recited in claim 1, wherein:
the electronic book stored in the memory comprises a formatting skeleton and multiple fragments, the formatting skeleton including formatting information for the electronic book and the multiple fragments including the text of the electronic book; and
the additional content comprises a fragment to insert at a particular location of the formatting skeleton.

8. An electronic device as recited in claim 7, wherein the fragment is inserted into the formatting skeleton in addition to each of the multiple fragments of the electronic book.

9. An electronic device as recited in claim 7, wherein the fragment is inserted at the particular location of the formatting skeleton in lieu of one of the multiple fragments of the electronic book.

10. An electronic device as recited in claim 7, wherein the fragment of the additional content represents a paragraph of the electronic book.

11. An electronic device as recited in claim 7, wherein the fragment of the additional content represents an individual word of the electronic book.

12. An electronic device as recited in claim 1, wherein the rendering module renders, on the display and adjacent to one or more corrections included in the additional content, an indication that text associated with the one or more corrections has been corrected.

13. An electronic device as recited in claim 1, wherein the rendering module is executable on the one or more processors to:
receive, from the server, one or more corrections made to the portion of the electronic book by another user of the electronic device; and
display the portion of the electronic book with the one or more corrections.

14. An electronic device as recited in claim 1, wherein the additional content includes one or more corrections made to the portion of the electronic book by other users reading the electronic book on other electronic devices.

15. An electronic device as recited in claim 1, wherein the rendering module is executable on the one or more processors to:
receive, from the server, one or more corrections made to the portion of the electronic book by an authority source associated with the electronic book; and
display the portion of the electronic book with the one or more corrections.

16. An electronic device as recited in claim 1, further comprising:
a corrections module, stored in the memory and executable on the one or more processors, to:
receive a request to create a corrections file that includes corrections to the portion of the electronic book; and
store the corrections in the corrections file.

17. An electronic device as recited in claim 1, further comprising:
a corrections module, stored in the memory and executable on the one or more processors, to:
receive a request to make corrections to the portion of the electronic book; and
store the requested corrections in the corrections file without modifying the electronic book stored in the memory of the device.

18. One or more non-transitory computer-readable media storing computer-executable instructions that, when executed, cause one or more processors to perform acts comprising:
receiving, at a server from an electronic device of a user, a request to determine whether a first portion of an electronic book is to be substituted by a second portion previously created by the user, wherein the second portion is pre-approved by at least one of an authoritative source or crowdsourcing;
determining context information associated with the first portion of the electronic book, the context information including at least a current location associated with the first portion of the electronic book;
determining, based at least in part on the context information, that the first portion of the electronic book is to be substituted by the second portion; and
sending the second portion to the electronic device and at least one additional electronic device storing a copy of the electronic book.

19. One or more non-transitory computer-readable media as recited in claim 18, wherein at least one of the first portion or the second portion of the electronic book comprise text, an image, or a table of the electronic book.

20. One or more non-transitory computer-readable media as recited in claim 18, wherein the second portion is stored and displayed without modifying a file storing contents of the electronic book.

21. One or more non-transitory computer-readable media as recited in claim 18, wherein the acts further comprise storing the request in a file that is separate from the electronic book, wherein the file resides remotely from the electronic device.

22. One or more non-transitory computer-readable media as recited in claim 21, wherein the acts further comprise sending the file to the electronic device prior to or upon receiving an indication that the electronic device is requesting to render the first portion of the electronic book.

23. One or more non-transitory computer-readable media as recited in claim 18, wherein the acts further comprise storing the request in a file that is separate from the electronic book, wherein the file resides on the electronic device.

24. One or more non-transitory computer-readable media as recited in claim 18, wherein the second portion comprises a translated version of the first portion of the electronic book.

25. One or more non-transitory computer-readable media as recited in claim 18, wherein the second portion comprises a censored version of the first portion of the electronic book.

26. One or more non-transitory computer-readable media as recited in claim 22, wherein the file is associated with a particular group of one or more electronic devices, and wherein the receiving of the indication comprises receiving an indication that an electronic device of the particular group is requesting to render the first portion of the electronic book.

27. One or more non-transitory computer-readable media as recited in claim 18, wherein the request comprises a request to substitute each occurrence of the first portion of the electronic book with the second portion, and wherein the second portion is displayed in lieu of each occurrence of the first portion on the electronic device.

28. One or more non-transitory computer-readable media as recited in claim 18, wherein the first and second portions comprise at least one of individual words, sentences, or paragraphs of the electronic book, respectively.

29. A method comprising:
   under control of one or more computer systems configured with specific executable instructions,
   displaying a portion of a content item on an electronic device;
   determining an occurrence of an event associated with a user of the electronic device and the portion of the content item;
   publishing the occurrence of the event to an application;
   determining context information associated with the portion of the content item, the context information including a current location of the portion of the content item displayed on the electronic device;
   receiving, from a server, supplemental content previously created by the user and corresponding to the current location of the portion of the content item, wherein the supplemental content is pre-validated for accuracy by at least one of an authoritative source or crowdsourcing;
   and
   displaying, by the application, the supplemental content on the electronic device without modifying a content file storing contents of the content item.

30. A method as recited in claim 29, wherein the content item comprises an electronic book, an audio file, or a video file.

31. A method as recited in claim 29, wherein the supplemental content includes a compilation of corrections to the portion of the content item provided by multiple different users.

32. A method as recited in claim 29, wherein the supplemental content includes a compilation of corrections to the portion of the content item requested by the user of the electronic device.

33. A method as recited in claim 29, wherein the content item comprises an electronic book, and the displaying the supplemental content without modifying the content file comprises substituting the supplemental content for the portion of the content item at a particular location in the electronic book.

34. A method as recited in claim 29, wherein:
   the content item comprises an electronic book comprising a formatting skeleton and multiple fragments, the formatting skeleton including formatting information for the electronic book and the multiple fragments including text of the electronic book;
   the supplemental content comprises a fragment to insert at a particular location of the formatting skeleton; and
   the displaying the supplemental content without modifying the content file comprises inserting the fragment associated with the supplemental content into the formatting skeleton.

\* \* \* \* \*